United States Patent [19]

Myers

[11] Patent Number: 5,097,396
[45] Date of Patent: Mar. 17, 1992

[54] FIBER OPTIC BACKLIGHTING PANEL

[75] Inventor: J. Michael Myers, Newport Beach, Calif.

[73] Assignee: Poly-Optical Products, Inc., Santa Ana, Calif.

[21] Appl. No.: 587,705

[22] Filed: Sep. 25, 1990

[51] Int. Cl.$^5$ .............................. F21V 7/05
[52] U.S. Cl. ........................ 362/32; 362/29; 362/30
[58] Field of Search .................. 362/24, 29, 30, 88, 362/95, 32, 97

[56] References Cited

U.S. PATENT DOCUMENTS

| | | |
|---|---|---|
| 2,909,857 | 10/1959 | Wilson . |
| 3,592,199 | 7/1971 | Ostensen ........................ 362/32 |
| 3,692,383 | 9/1972 | Herod et al. . |
| 3,829,675 | 8/1974 | Mariani . |
| 3,886,544 | 5/1975 | Narodny ........................ 362/32 |
| 4,052,120 | 10/1977 | Sick et al. . |
| 4,124,879 | 11/1978 | Schoemer ...................... 362/24 |
| 4,128,332 | 12/1978 | Rowe . |
| 4,139,261 | 2/1979 | Hilsum . |
| 4,141,058 | 2/1979 | Mizohata et al. . |
| 4,141,161 | 2/1979 | Hiscock et al. . |
| 4,142,312 | 3/1979 | Stokes . |
| 4,172,631 | 10/1979 | Yevick . |
| 4,173,390 | 11/1979 | Kach . |
| 4,177,501 | 12/1979 | Karlin . |
| 4,195,907 | 4/1980 | Zamja et al. . |
| 4,196,962 | 4/1980 | Sick . |
| 4,214,391 | 7/1980 | Angst . |
| 4,234,907 | 11/1980 | Daniel . |
| 4,389,085 | 6/1983 | Mori . |
| 4,389,698 | 6/1983 | Cibie . |
| 4,420,740 | 12/1983 | Brown et al. . |
| 4,422,719 | 12/1983 | Orcutt . |
| 4,459,642 | 7/1984 | Mori . |
| 4,471,412 | 9/1984 | Mori . |
| 4,519,017 | 5/1985 | Daniel . |
| 4,535,396 | 8/1985 | Guthrie . |
| 4,544,990 | 10/1985 | Wieselman et al. . |
| 4,555,694 | 11/1985 | Yanagishima et al. . |
| 4,559,583 | 12/1985 | Ku . |
| 4,561,043 | 12/1985 | Thompson . |
| 4,585,298 | 4/1986 | Mori . |
| 4,636,028 | 1/1987 | Mori . |
| 4,640,592 | 2/1987 | Nishimura et al. . |
| 4,670,633 | 6/1987 | Kaiwa et al. .............. 362/24 |
| 4,673,918 | 6/1987 | Adler et al. . |
| 4,678,279 | 7/1987 | Mori . |
| 4,685,766 | 8/1987 | Nishimura et al. . |
| 4,693,552 | 9/1987 | Jeskey . |
| 4,699,448 | 10/1987 | Mori . |
| 4,717,226 | 1/1988 | Mori . |
| 4,726,641 | 2/1988 | Mori . |
| 4,730,883 | 3/1988 | Mori . |
| 4,732,442 | 3/1988 | Mori . |
| 4,733,332 | 3/1988 | Yamashita et al. . |
| 4,747,648 | 5/1988 | Gilliland, III . |
| 4,761,047 | 8/1988 | Mori . |
| 4,763,984 | 8/1988 | Awai et al. . |
| 4,765,701 | 8/1988 | Cheslak . |
| 4,779,166 | 10/1988 | Tanaka et al. ............. 362/32 |
| 4,786,139 | 11/1988 | Sedlmayr . |
| 4,822,123 | 4/1989 | Mori . |
| 4,830,899 | 5/1989 | Nakahashi et al. . |
| 4,845,596 | 7/1989 | Mouissie ..................... 362/30 |
| 4,867,530 | 9/1989 | Sedlmayr .................... 362/32 |
| 4,914,553 | 4/1990 | Hamada et al. ............. 362/32 |
| 4,977,487 | 12/1990 | Okano ......................... 362/32 |
| 5,001,306 | 3/1991 | Purcell ........................ 362/97 |

*Primary Examiner*—Ira S. Lazarus
*Assistant Examiner*—Y. Quach
*Attorney, Agent, or Firm*—Nilsson, Robbins, Dalgarn, Berliner, Carson & Wurst

[57] ABSTRACT

A fiber optic panel provides backlighting in devices such as rubber keypads, membrane switches, liquid crystal displays, rigid panels, or the like. The fiber optic panel comprises a light source for emitting light and a fiber optic cable which transmits the light to a plurality of different locations throughout the device. The fiber optic cable comprises a plurality of optical fibers, each of which individually terminates at one of a plurality of different locations to illuminate that location. Alternatively, the optical fibers individually terminate at evenly spaced locations throughout the device to illuminate a region uniformly.

12 Claims, 2 Drawing Sheets

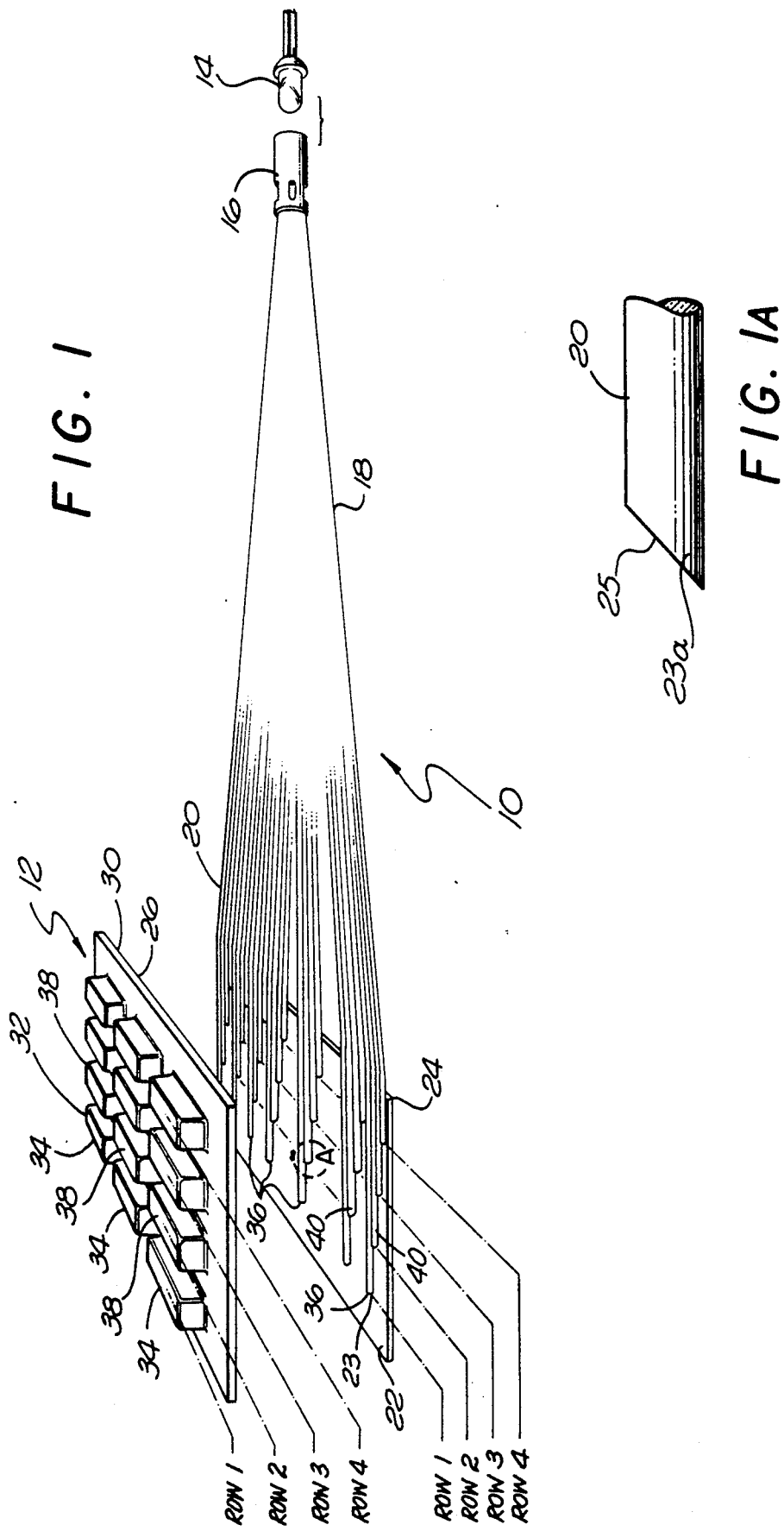

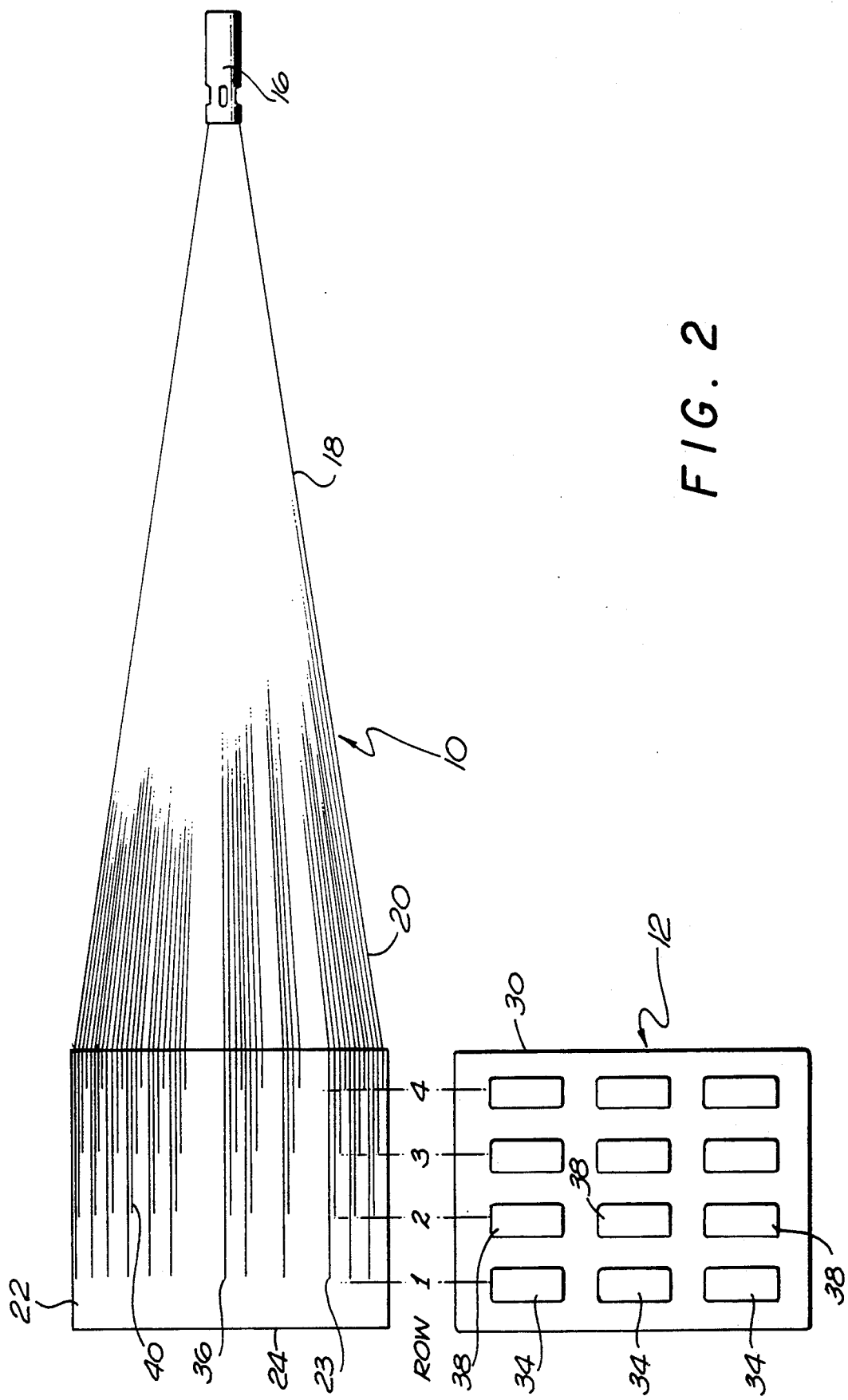

FIBER OPTIC BACKLIGHTING PANEL

FIELD OF THE INVENTION

The present invention relates generally to the field of backlighting. More specifically, the present invention relates to a fiber optic backlighting panel.

BACKGROUND OF THE INVENTION

Backlighting is commonly used in rubber keypads, membrane switches, liquid crystal displays, rigid panels, and the like, to make them more discernible and enhance their visibility. Existing techniques have utilized fiber optics for this purpose.

Typically, such prior backlighting devices utilize a light source, the light from which is transmitted via a fiber optic cable to a keyboard, or like device, for which backlighting is desired. At each of a desired number of locations on the portion of the cable positioned behind the panel to be backlit, a suitable notch is formed, typically by using a hot stamping machine. The stamping machine forms the notch by pressing against the fiber optic cable at the desired location. As the light passes down the fiber optic cable, a portion of the light will exit through the notch and illuminate the location above that region. Typically, the remaining light continues its travel along the fiber optic cable and terminates at a location remote from the notch.

In such prior devices, the light which exits through the notch provides backlighting of relatively low intensity. Also, the intensity of light along the fiber optic cable diminishes as light is reflected through a series of such notches along the fiber optic cable. Thus, although such prior devices are known to serve their purpose, they have not proven to be entirely satisfactory.

A need thus exists for an improved apparatus for providing backlighting in a device which ensures increased brightness at specific points and a uniform distribution of light for all regions of the device to be backlit.

SUMMARY OF THE INVENTION

Briefly, the present invention is directed to a fiber optic panel for providing backlighting in devices such as rubber keypads, membrane switches, liquid crystal displays, rigid panels, and the like. The fiber optic backlighting panel, of novel design, advantageously features increased brightness at specific locations in a device for which backlighting is desired, as well as a uniform distribution of light for all regions of the device to be backlit.

In one aspect of the present invention, the fiber optic backlighting panel comprises a fiber optic cable transmitting light from a light source and comprising a plurality of optical fibers, each of which individually terminates at different locations on the panel to ensure increased brightness at that location.

In another aspect of the present invention, each of the optical fibers individually terminates at a location on the panel corresponding to a specific location in the device where backlighting is desired.

In still another aspect of the present invention, the optical fibers individually terminate at spaced or random locations throughout the panel to provide a uniform distribution of bright light.

These as well as other features of the invention will become apparent from the detailed description which follows, considered together with the appended drawings.

BRIEF DESCRIPTION OF THE DRAWINGS

A preferred embodiment of the present invention is illustrated in and by the following drawings in which like reference numerals indicate like parts and in which:

FIG. 1 is an exploded perspective view of a fiber optic backlighting panel of the present invention;

FIG. 1A is an exploded view of an optical fiber in the fiber optic backlighting panel shown in FIG. 1, illustrating a beveled end portion; and FIG. 2 is an exploded plan view of the fiber optic backlighting panel of the present invention shown in FIG. 1.

DETAILED DESCRIPTION OF THE PREFERRED EMBODIMENT

Referring to FIGS. 1 and 2, there is shown generally a fiber optic backlighting panel 10 of the present invention. For illustrative purposes the fiber optic backlighting panel 10 as shown in FIGS. 1 and 2 is used for providing backlighting in a keyboard 12. The illustrated embodiment is purely exemplary of the diverse applications for which the backlighting panel 10 may be used. The backlighting panel 10 advantageously features increased brightness and intensity at specific locations in the device and an even distribution of light for all the regions of the device to be backlit in order to enhance perceptibility.

The backlighting panel 10 comprises a light source 14, of conventional design, for emitting light through a ferrule 16, known in the art, attached to the light source 14. Light is transmitted through a fiber optic cable 18, comprising a plurality of individual optical fibers, indicated generally at 20, to a plurality of different locations in a desired area for which backlighting is desired. The fiber optic cable 18 may be of any commercially available type. To provide an even distribution of light for all the regions of the device to be backlit, the optical fibers 20 preferably have consistent diameter lengths. Alternatively, optical fibers 20 of different diameter lengths are used to provide increased brightness in particular regions of the device. For example, to facilitate increased brightness only in designated regions of the device, preferably optical fibers 20 of larger diameter lengths are utilized.

In an exemplary embodiment illustrated in FIGS. 1 and 2, the plurality of optical fibers 20 terminate at a plurality of different locations on an upper surface 22 of a reflective backing 24. Preferably, an end portion 23 of each optical fiber 20 is severed and adhered to the surface of the reflective backing 24. The optical fiber 20 is adhered to the surface of the reflective backing by using any suitable adhesive known in the art. Alternatively, a suitable adhesive layer is applied to the surface of the reflective backing. The end portion 23 is preferably severed along an axis perpendicular to the optical fiber 20, or alternatively, is severed at an angle 25 as best shown in FIG. 1A. A beveled end portion 23a further enhances the light intensity at the location directly above. In this manner, light transmitted through the optical fiber 20 is suitably terminated, thereby focussing all its intensity at that point.

The reflective backing 24 attaches to a lower extremity 26 of the keyboard 12. The backing 24 is preferably configured in shape and area to conform to the device for which backlighting is desired. As shown in FIGS. 1 and 2, the backing 24 is configured to conform to a peripheral extremity 30 of the keyboard 12. The backing 24 is preferably rectangular in shape and has similar dimensions as the keyboard 12.

The keyboard 12 typically comprises a plurality of keypads 32 aligned in rows, as best shown in FIG. 1. The keypads 32 are aligned along ROW 1, ROW 2, ROW 3 and ROW 4. In a preferred embodiment, each of the plurality of keypads 32 is illuminated by an individually terminated optical fiber 20. For example, the keypads 32 aligned along ROW 1, indicated at 34, are illuminated by portions 23 of the individually terminated optical fibers 20, aligned along ROW 1, indicated at 36. In a similar fashion, keypads aligned along ROW 2, indicated at 38, are illuminated by portions 23 of individually terminated optical fibers, also aligned along ROW 2, indicated at 40. Thus, each of the optical fibers 20 is advantageously positioned and terminated directly below each of the keypads 32 in a matrix like configuration.

Alternatively, each of the optical fibers 20 is individually terminated at spaced or random locations throughout the plane of the device for which backlighting is desired in order to ensure a uniform distribution of light for all the regions of the device.

The fiber optic backlighting panel has been primarily described herein for providing backlighting in a keyboard, however, the invention may also be used to provide backlighting in membrane switches, liquid crystal displays, rigid panels, vehicle panels and other devices which will be obvious to those skilled in the art.

Although the invention has been described in terms of a preferred embodiment thereof, other embodiments that are apparent to those of ordinary skill in the art are also within the scope of the invention. Accordingly, the scope of the invention is intended to be defined only by reference to the appended claims.

What is claimed is:

1. A fiber optic panel for providing backlighting in a device, comprising:
   a light source;
   a reflective backing;
   a plurality of individual optical fibers adapted to transmit light from said light source, said optical fibers having end portions at least partially terminating at different locations proximate to the reflective backing, said end portions of said optical fibers providing increased intensity of light at said different locations.

2. A fiber optic panel for providing backlighting in a device as defined in claim 1, wherein said end portions of said plurality of optical fibers are aligned directly above said reflective backing.

3. A fiber optic panel for providing backlighting in a device as defined in claim 1, wherein said end portions of said plurality of optical fibers are evenly spaced on said reflective backing for providing a uniform distribution of light.

4. A fiber optic panel for providing backlighting in a device as defined in claim 1, wherein said plurality of optical fibers have consistent diameters for providing an even distribution of light.

5. A fiber optic panel for providing backlighting in a device as defined in claim 1, wherein said end portions of said plurality of optical fibers are adhered to said reflective backing.

6. A fiber optic panel for providing backlighting in a device as defined in claim 1, wherein said reflective backing comprises a layer of adhesive.

7. A fiber optic panel for providing backlighting in a device as defined in claim 1, wherein said end portions of said plurality of optical fibers are beveled.

8. A fiber optic panel for providing backlighting in a device as defined in claim 1, wherein said end portions of said plurality of optical fibers are severed along an axis perpendicular to said optical fiber.

9. A fiber optic panel for providing backlighting in a device as defined in claim 1, wherein said fiber optic panel provides illumination in a membrane switch.

10. A fiber optic panel for providing backlighting in a device as defined in claim 1, wherein said fiber optic panel provides illumination in a rubber keypad.

11. A fiber optic panel for providing backlighting in a device as defined in claim 1, wherein said end portions of said plurality of optical fibers are arranged in a matrix form.

12. An apparatus for providing backlighting in a device, comprising:
    a fiber optic light source emitting light;
    a plurality of individual optical fibers transmitting the light from said light source to a reflective backing, each of said plurality of individual optical fibers having an end portion terminating at a specific location on said reflective backing, said end portion adhered to said reflective backing, said terminated end portion of said optical fiber providing an increased intensity of said light at a location in the device directly above said specific location on said reflective backing.

* * * * *